UNITED STATES PATENT OFFICE 2,484,330

STABILIZATION OF DIALKYL HALOACETALS

Hans Beller, Cranford, N. J., assignor to General Aniline & Film Corporation, New York, N. Y., a corporation of Delaware No Drawing. Application December 30, 1947, Serial No. 794,796

5 Claims. (Cl. 260—611.5)

This invention relates to the treatment of dialkyl haloacetals for the purpose of stabilizing them against the development of acidity therein and to the compositions resulting therefrom.

While the invention will be described with particular reference to the correction of acid development in dimethyl chloroacetal, a compound of the formula:

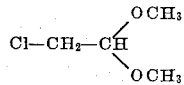

it will be obvious therefrom that it is in the same manner applicable to the correction of the like acid development in other dialkyl haloacetals.

Dimethyl chloroacetal is a valuable intermediate in the manufacture of a pharmaceutical compound. It is prepared as a highly pure practically anhydrous product of substantially less than 1% water content and packed as such in steel drums for shipment. Subsequent observation showed the steel drums to have become corroded and the dimethyl chloroacetal, discolored. Investigation of the cause for the corrosion showed the dimethyl chloroacetal to have developed acid during shipment. The discoloration of the product most probably is due to the formation of an iron salt or salts of the developed hydrochloric acid.

To correct this condition it was conceived that a basic substance should be added to the dimethyl chloroacetal as a stabilizing agent, selection of the basic substance to be used, obviously, also to be controlled by its nature and the ultimate use of the dimethyl chloroacetal treated therewith. A number of amines were tried, among them, triethylamine, octylamine, monoethanolamine, diethanolamine, cyclohexylamine, phenyl - $\alpha$ - naphthylamine and phenyl - $\beta$ - naphthylamine. Neither these nor the amines as a class are effective for the purpose.

I have found, however, that development of acid in dimethyl chloroacetal can be prevented and the product safely shipped in steel drums or brought into prolonged contact with steel surfaces of other design when there is added to the dimethyl chloroacetal a small proportion of triethanolamine.

In the practice of the invention, the triethanolamine is mixed in simple fashion with the dimethyl chloroacetal and is effective to prevent acid development in the chloroacetal when used in amounts as low as 0.1% by weight or even less. Larger amounts may also be used, such as 1 to 2%, but such are not recommended because of the low order of solubility of the triethanolamine in the chloroacetal. Generally, and as a practical matter, the amount should not exceed the solubility of the triethanolamine in the chloroacetal at the temperature of use of the latter. For room temperature of 20° C., this amount would not exceed 0.1% by weight on the dimethyl chloroacetal. At higher temperatures, for example, at 80° C., triethanolamine is more soluble in the chloroacetal. Solubility of the triethanolamine in the chloroacetal at room temperature can be increased by the addition of a very slight amount of water.

The effect of triethanolamine in stabilizing dimethyl chloroacetal against development of acidity therein on standing is demonstrated by the following tests.

Three pounds of freshly purified dimethyl chloroacetal was placed in each of two unlacquered, 5 gallon, bung type, steel drums. 1% by weight of triethanolamine on the dimethyl chloroacetal was mixed therewith in the one drum, while to the other none was added. The drums were then stored, the temperature during storage ranging from approximately 10° to 30° C. After a storage period of 37 days, the drums were opened and the contents examined. The dimethyl chloroacetal containing the triethanolamine was clear in color and titrated to a basicity equal to 1.59 grams of HCl, whereas the dimethyl chloroacetal not containing the triethanolamine was brownish-red in color and titrated to an acidity equal to 0.0022 gram of NaOH.

The advantage of the presence of triethanolamine in the dimethyl chloroacetal is not limited to its function as an agent for the prevention of acidity, but it also has the valuable property of retarding the formation of peroxides in the chloroacetal. This is a highly valuable function of the triethanolamine, since peroxides are inherently dangerous when present during the distillation of liquids, especially as the point of dryness is approached when they have been known to cause explosion. When mixed with the freshly prepared dimethyl chloroacetal before peroxides form therein, the triethanolamine will inhibit completely or almost completely the formation of peroxides. Added later, after the formation of peroxides, it will serve to slow up further formation thereof.

I claim:

1. A method of stabilizing a dialkyl haloacetal which comprises mixing a small proportion of triethanolamine therewith.

2. A method of treating a dialkyl haloacetal which comprises mixing it in a highly pure form with a small proportion of triethanolamine.

3. A method of treating dimethyl chloroacetal which comprises mixing it in a highly pure form with a small proportion of triethanolamine therein.

4. A composition of matter comprising a dialkyl haloacetal mixed with a small proportion of triethanolamine.

5. A composition of matter comprising dimethyl chloroacetal mixed with a small proportion of triethanolamine.

HANS BELLER.

REFERENCES CITED

The following references are of record in the file of this patent:

UNITED STATES PATENTS

| Number | Name | Date |
| --- | --- | --- |
| 2,035,383 | Cox | Mar. 24, 1936 |
| 2,130,079 | Evans | Sept. 13, 1938 |